United States Patent
Nainar et al.

(10) Patent No.: US 10,581,732 B2
(45) Date of Patent: *Mar. 3, 2020

(54) TARGET FEC (FORWARDING EQUIVALENCE CLASS) STACK BASED FEC QUERY IN SEGMENT ROUTING ENVIRONMENTS

(71) Applicant: CISCO TECHNOLOGY, INC., San Jose, CA (US)

(72) Inventors: Nagendra Kumar Nainar, Morrisville, NC (US); Carlos M. Pignataro, Raleigh, NC (US); Faisal Iqbal, Ottawa (CA)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/259,435

(22) Filed: Jan. 28, 2019

(65) Prior Publication Data
US 2019/0158393 A1   May 23, 2019

Related U.S. Application Data

(63) Continuation of application No. 15/253,487, filed on Aug. 31, 2016, now Pat. No. 10,237,173.
(Continued)

(51) Int. Cl.
*H04L 1/00* (2006.01)
*H04L 12/723* (2013.01)
(Continued)

(52) U.S. Cl.
CPC ............ *H04L 45/50* (2013.01); *H03M 13/47* (2013.01); *H04L 1/004* (2013.01); *H04L 45/00* (2013.01);
(Continued)

(58) Field of Classification Search
CPC ....... H04L 1/0078; H04L 45/50; H04L 1/004; H04L 45/28; H03M 13/47; H04W 12/1002
See application file for complete search history.

(56) References Cited

U.S. PATENT DOCUMENTS 7,940,695 B1 * 5/2011 Bahadur ............ H04L 43/0811
370/254
8,472,346 B1   6/2013 Bahadur
(Continued)

OTHER PUBLICATIONS

IETF RFC 4379 "Detecting Multi—Protocol Lavel Switched (MPLS) Data Plane Failures", K. Kompella et al., Feb. 2006.
(Continued)

*Primary Examiner* — Salvador E Rivas
(74) *Attorney, Agent, or Firm* — Cindy Kaplan

(57) ABSTRACT

In one embodiment, a method includes generating a trace request at an initiator node configured for segment routing, the trace request comprising an FEC (Forwarding Equivalence Class) query corresponding to a label in an FEC stack with an unknown FEC, transmitting the trace request on a path with the unknown FEC, and receiving a response to the trace request, the response comprising FEC information including an identifier associated with a label and a forwarding path and representing a class or category of packets. An apparatus is also disclosed herein.

20 Claims, 19 Drawing Sheets

Related U.S. Application Data

(60) Provisional application No. 62/365,336, filed on Jul. 21, 2016.

(51) Int. Cl.
| | |
|---|---|
| *H04L 12/911* | (2013.01) |
| *H04L 12/721* | (2013.01) |
| *H04L 12/701* | (2013.01) |
| *H04L 12/751* | (2013.01) |
| *H04L 12/703* | (2013.01) |
| *H03M 13/47* | (2006.01) |
| *H04L 12/733* | (2013.01) |
| *H04W 12/10* | (2009.01) |

(52) U.S. Cl.
CPC .............. *H04L 45/02* (2013.01); *H04L 45/20* (2013.01); *H04L 45/26* (2013.01); *H04L 45/28* (2013.01); *H04L 47/825* (2013.01); *H04W 12/1002* (2019.01)

(56) References Cited

U.S. PATENT DOCUMENTS

| | | | |
|---|---|---|---|
| 9,660,897 B1* | 5/2017 | Gredler | H04L 45/50 |
| 10,237,173 B2* | 3/2019 | Nainar | H04L 47/825 |
| 2003/0145105 A1* | 7/2003 | Desineni | H04L 41/12 |
| | | | 709/238 |
| 2008/0095061 A1 | 4/2008 | Hua | |
| 2015/0109907 A1 | 4/2015 | Akiya | |

OTHER PUBLICATIONS

IETF RFC 6424, "Mechanism for Perfoming Label Switched Path Ping (LSP Ping) over MPLS Tunnels", N. Nahadur et al., Nov. 2011.
IETF Draft "Label Switched Path ( LSP ) Ping / Trace for Segment Routing Networks Using MPLS Dataplane", draft—ietf—mpls—spring lsp—ping—00, N. Kumar et al., May 10, 2016.

* cited by examiner

TARGET FEC (FORWARDING EQUIVALENCE CLASS) STACK BASED FEC QUERY IN SEGMENT ROUTING ENVIRONMENTS

STATEMENT OF RELATED APPLICATION

The present application is a continuation of U.S. patent application Ser. No. 15/253,487, entitled TARGET FEC (FORWARDING EQUIVALENCE CLASS) STACK BASED FEC QUERY IN SEGMENT ROUTING filed Aug. 31, 2016, which claims priority from U.S. Provisional Application No. 62/365,336, entitled TARGET FEC (FORWARDING EQUIVALENCE CLASS) STACK BASED FEC QUERY IN SEGMENT ROUTING ENVIRONMENTS, filed on Jul. 21, 2016. The contents of these applications are incorporated herein by reference in their entirety.

TECHNICAL FIELD

The present disclosure relates generally to communication networks, and more particularly, to connectivity verification in Segment Routing networks.

BACKGROUND

Segment Routing (SR) architecture leverages source routing and tunneling paradigms and can be directly applied to an MPLS (Multiprotocol Label Switching) data plane. A node steers a packet through a controlled set of instructions called segments, by prepending the packet with an SR header. Rather than depending on a hop-by-hop signaling technique, SR depends on a set of segments that are advertised by a routing protocol. These segments act as topological sub-paths that can be combined together to form a desired path. Segment Routing allows a head end of the path to impose a stack of labels without knowing the control plane details of each of those labels. This raises challenges in path validation.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
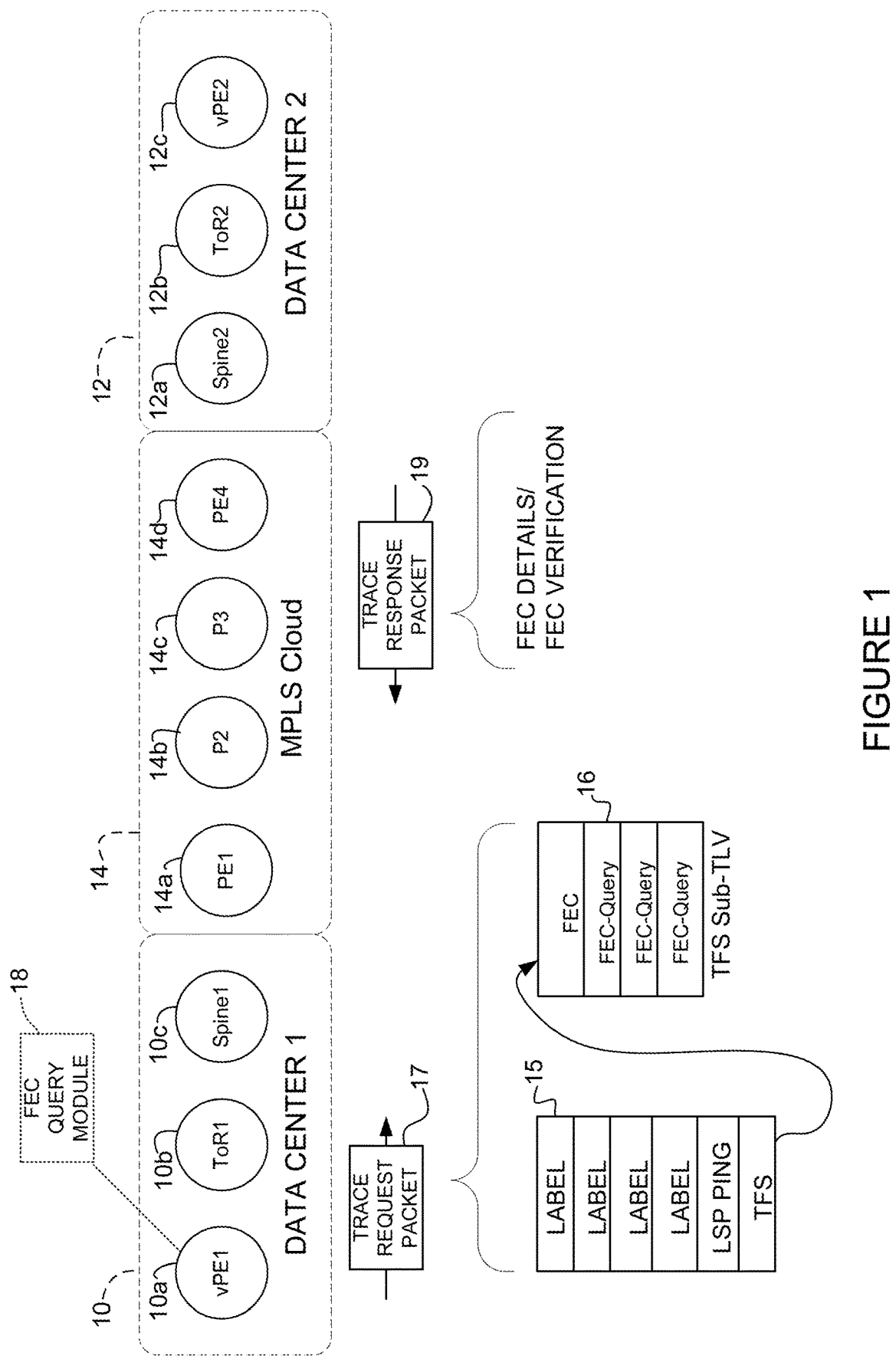
FIG. 1 illustrates an example of a network in which embodiments described herein may be implemented.

In one embodiment, a method generally comprises generating a first trace request at an initiator node configured for segment routing, the first trace request comprising a query for FEC (Forwarding Equivalence Class) information, transmitting the first trace request on a path comprising at least one node wherein FEC details for the node are unknown by the initiator node, receiving a response to the first trace request comprising the FEC information, transmitting a second trace request with the FEC information, and receiving a response to the second trace request providing FEC validation.

In another embodiment, an apparatus generally comprises an interface for transmitting packets on an LSP (Label Switched Path), a processor for generating a trace request at an initiator node configured for segment routing, the trace request comprising a query for FEC (Forwarding Equivalence Class) information, transmitting the trace request on a path comprising at least one node wherein FEC details for the node are unknown by the initiator node, and processing a response to the trace request comprising the FEC information.

In yet another embodiment, logic is encoded on one or more non-transitory computer readable media for execution and when executed operable to generate a first trace request at an initiator node configured for segment routing, the first trace request comprising a query for FEC (Forwarding Equivalence Class) information, transmit the first trace request on a path comprising at least one node wherein FEC details for the node are unknown by the initiator node, process a response to the first trace request comprising the FEC information for the node, transmit a second trace request with the FEC information, and process a response to the second trace request providing FEC validation.

EXAMPLE EMBODIMENTS

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Path validation may be used to verify end-to-end connectivity along a data path. One mechanism for detecting data plane failures in LSPs (Label Switched Paths) is modeled after a ping/traceroute paradigm and referred to as LSP Ping. LSP Ping traditionally uses a target FEC (Forwarding Equivalence Class) stack for FEC validation. The LSP to be tested is identified by the FEC stack. The test verifies that packets that belong to a particular FEC actually end their path on a node that is an egress for that FEC. LSP Ping machinery defined in IETF (Internet Engineering Task Force) RFC (Request for Comments) 4379 ("Detecting Multi-Protocol Label Switched (MPLS) Data Plane Failures", K. Kompella et al., February 2006) carries FEC details in a Target FEC Stack Sub-TLV (Type-Length-Value) that may be used by transit or egress nodes for FEC validation.

Segment Routing (SR) leverages source routing and tunneling paradigms and can be directly applied to an MPLS (Multiprotocol Label Switching) data plane. Segment Routing differs from other MPLS control plane protocols, in that segment assignment is not on a hop-by-hop basis. Segment Routing allows a head end to impose a stack of labels without knowing the control plane details of each of those labels. This raises issues for connectivity verification in an LSP with segment routing architecture.

IETF draft-ietf-mpls-spring-lsp-ping-00 ("Label Switched Path (LSP) Ping/Trace for Segment Routing Networks Using MPLS Dataplane", N. Kumar et al., May 10, 2016) proposes an extension for LSP Ping with Segment Routing that utilizes different FECs (IPv4 IGP-Prefix Segment ID, IPv6 IGP-Prefix Segment ID, and IGP-Adjacency Segment ID). These mechanisms may not provide sufficient validation when the FEC being traced traverses one or more MPLS tunnels or when LSP stitching is used. For example, in some scenarios an initiator of a connectivity test may not have any way to fetch FEC details. Thus, conventional LSP Ping may not provide FEC validation in Segment Routing networks due to lack of downstream FEC details.

FEC stack changes proposed in IETF RFC 6424 ("Mechanism for Performing Label Switched Path Ping (LSP Ping) over MPLS Tunnels", N. Bahadur et al., November 2011) may not be sufficient to provide FEC validation over one or more MPLS tunnels. As per RFC 6424, when a transit node PUSHes a new label (LSP stitching, LSP tunneling, hierarchical LSP etc.), it includes the new FEC details. When it is a POP, it just includes the details about the label to be popped. In Segment Routing, a response from a responder will carry FEC stack change (e.g., as described in IETF RFC 6424) and instruct an ingress node to POP the top FEC in the Target FEC Stack. The response may also include downstream details (e.g., interface address and router ID). However, there is no mechanism to instruct the downstream FEC details in the label stack.

Additionally, it may be desired to stitch the SR control plane with traditional MPLS control planes running LDP (Label Distribution Protocol) and/or RSVP-TE (Resource Reservation Protocol)-(Traffic Engineering). An operator running Segment Routing may push a label stack to validate the end-to-end LSP. However, a provider edge node may not have knowledge of the MPLS cloud to specify the corresponding FEC details in the Target FEC Stack (TFS). The conventional response from instructing FEC stack change is not sufficient to allow inclusion of downstream FEC details from the MPLS cloud.

A similar use case is a network in which the operator desires to stitch traditional MPLS LDP and RSVP-TE LSPs with Segment Routing LSPs running BGP (Border Gateway Protocol) and/or IGP (Interior Gateway Protocol). An originator in a Segment Routing cloud may not have intimate knowledge of the MPLS cloud to include in the TFS.

As described above, conventional mechanisms may not be sufficient to provide end-to-end connectivity verification when an LSP traverses one or more tunnels or LSP stitching is used, for example, in Segment Routing networks.

The embodiments described herein may be used to provide LSP Ping control plane validation for Segment Routing (SR), as well as for SR<->LDP (Label Distribution Protocol) hybrid deployments and scenarios. As previously described, a Segment Routing head end may not have the control plane details of the label of each label stack element in the Segment Routing (or SR+LDP) stack. Consequently, it cannot fill in the TFS (Target FEC Stack). The embodiments described herein provide a means for obtaining FEC details and control plane information from a node adjacent to the node with context for the label. In one or more embodiments, a new semantic is provided for the Target FEC Stack (TFS), so that the target is a query. An adjacent node may then be queried for control plane details of the downstream node.

Referring now to the drawings, and first to FIG. 1, a network in which embodiments described herein may be implemented is shown. For simplification, only a small number of nodes are shown. The embodiments operate in the context of a data communication network including multiple network devices. The network may include any number of network devices in communication via any number of nodes (e.g., routers, switches, gateways, controllers, edge devices, access devices, aggregation devices, core nodes, intermediate nodes, or other network devices), which facilitate passage of data within the network. The network devices may communicate over one or more networks (e.g., local area network (LAN), metropolitan area network (MAN), wide area network (WAN), virtual private network (VPN), virtual local area network (VLAN), wireless network, enterprise network, corporate network, data center, Internet, intranet, radio access network, public switched network, or any other network).

In the example shown in FIG. 1, two data centers 10, 12 (Data Center 1, Data Center 2) and an MPLS cloud 14, each include a plurality of nodes. Data Center 1 includes vPE1 (virtual Provider Edge 1) (10a), ToR1 (Top of Rack 1) (10b), and Spine1 (10c). MPLS Cloud 14 includes PE1 (14a), P2 (14b), P3 (14c), and PE4 (14d). Data Center 2 includes Spine2 (12a), ToR2 (12b), and vPE2 (12c). The nodes may comprise routers or any other network device configured to perform routing functions. Each network may include any number of edge routers (e.g., PE nodes), core routers (e.g., P nodes), or virtual routers (e.g., vPE).

One or more nodes are configured to perform Segment Routing, which specifies a path that a packet will take through the network using a stack of segment identifiers (SIDs). A node steers a packet through a controlled set of instructions called segments by prepending the packet with a Segment Routing header. Segment Routing may be directly applied to an MPLS data plane.

Packets may be transmitted within the network via a Label Switched Path (LSP). Packets may enter the network via an ingress node, travel along an LSP of one or more core (transit) nodes and exit via an egress node. Each LSP is defined by a set of labels, which comprise locally significant identifiers that are used to identify a Forwarding Equivalence Class (FEC). The FEC represents packets that share a same requirement for transport (e.g., over the same path with the same forwarding treatment). Each LSP is associated with at least one FEC that specifies which packets are mapped to that LSP.

As shown in FIG. 1, the network may comprise any number of networks or tunnels. The network may also include stitched LSPs involving two or more LSP segments stitched together. In order to perform an end-to-end trace, the ingress node needs to know FEC information regarding each of the networks or stitched LSP segments.

A connectivity test may be performed by an ingress node of the LSP acting as an initiator node (e.g., node 10*a* in FIG. 1). The initiator node 10*a* initiates the connectivity test to trace and validate the paths between the ingress node and the egress node. In one embodiment, the connectivity test may be used to detect data plane failures in one or more LSP by exchanging request and response (reply) messages 17, 19 (also referred to as echo request/reply or trace request/reply messages). The trace request 17 may be used to test a particular LSP identified by an FEC stack and sent along the same path as other packets belonging to a given flow. The initiator node 10*a* transmits the trace request packet 17 and includes information identifying the flow (e.g., identified by an FEC) in an FEC stack. When the trace request is received, the receiver is expected to verify that the control plane and data plane are both healthy (for the FEC stack being pinged) and that the two planes are in sync. The connectivity test is successful when the trace request is received at an edge node that is verified to be the egress node for the flow identified in the trace request. As previously described, the initiator node may not have FEC details for each label in the label stack for the path. Thus, it cannot fill in the Target FEC stack and perform connectivity tests for the entire path (LSP, LSPs, segments) without obtaining additional FEC details and control plane information.

In one or more embodiments a new Target FEC Stack (TFS) Sub-TLV 16 (referred to herein as FEC-Query) is inserted into the trace request packet 17 to obtain FEC details needed to verify connectivity. The FEC-Query queries a node for control plane details on the FEC. An initiator node may include the FEC-Query Sub-TLV in a Target FEC Stack for each label in the stack with unknown FEC. A responder node may include the FEC details associated with the top label in the label stack. The initiator may then replace the FEC-Query Sub-TLV with the FEC details received in the response and send out a connectivity verification request. This process may be repeated one or more times along a path over any number of networks until the egress node is reached to provide end-to-end connectivity verification in a Segment Routing network.

FIG. 1 illustrates a label stack 15 comprising a new Target FEC Stack (TFS) Sub-TLV with three FEC-Query entries 16. In this example, the TFS Sub-TLV includes a first FEC label for a known FEC (e.g., Spine1 in Data Center 1) and three FEC-Query entries for PE1, PE4, and vPE2 (nodes (labels) with unknown FEC (FEC details, control plane information)). The semantic associated with the TFS Sub-TLV is to have the responder reply with the FEC details of the relevant label in the stack. The TFS sub-TLV may be used, for example, to obtain the FEC details and control plane information from the node adjacent to the one with context for the label. As described in detail below, the initiator may include an FEC-Query Sub-TLV in the Target FEC stack for each label in the stack with unknown FEC. The responder includes the FEC details associated with the next label in the label stack. The responder may perform FEC validation by fetching the label from the label stack of the received trace request and FEC details from the Target FEC Stack TLV to validate against the local control plane information.

An initiator node (e.g., node 10*a* in FIG. 1) may generate the LSP Ping (trace request) at an FEC query module 18. The FEC query module 18 may include initiator logic operable to generate the trace request packet 17. For example, the FEC query module 18 may be operable to generate the trace (echo) request and forward the packet toward an egress of the LSP being tested and process or store a trace response (echo reply) 19. The trace request 17 may be generated upon receipt of a connectivity test initiation message or a trace response 19.

Figure 2:
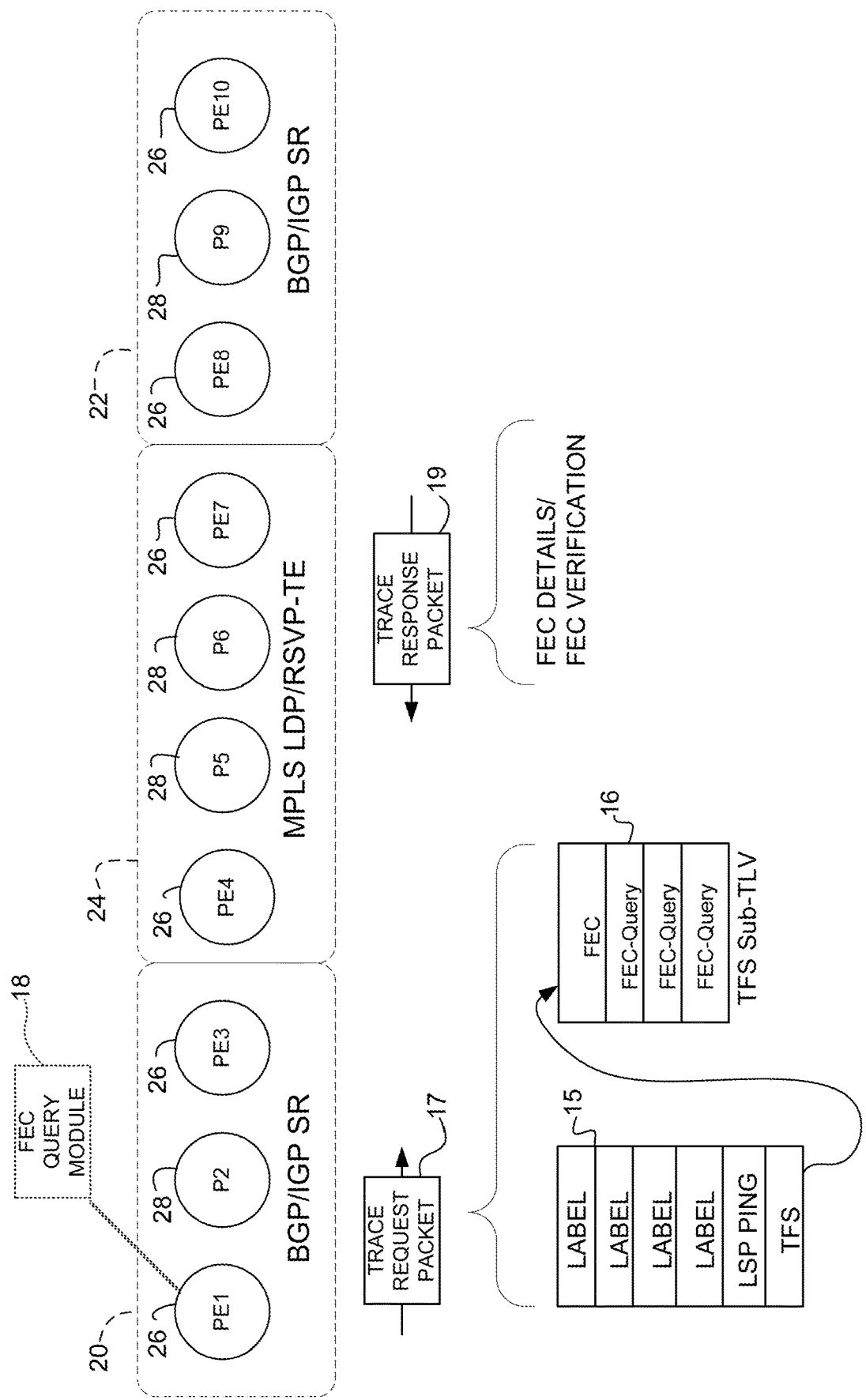
FIG. 2 illustrates another example of a network in which embodiments described herein may be implemented.

The Segment Routing control plane may also be used with traditional MPLS control planes running LDP and/or RSVP-TE as shown in the example of FIG. 2. In this example, two BGP/IGP Segment Routing networks 20, 22 are in communication via an MPLS LDP/RSVP-TE network 24. The networks 20, 22, 24 comprise a plurality of Provider Edge (PE) nodes 26 and core (Provider (P)) nodes 28. As previously described, the initiator PE1 may not have knowledge of the MPLS cloud sufficient to specify corresponding details in the Target FEC stack. The TFS sub-TLV with FEC-Query 16 may be used to obtain the FEC details as described below for the network shown in FIG. 1.

Details of example embodiments are provided below with respect to FIGS. 5-15 (trace mode) and 16-19 (ping mode).

It is to be understood that the network devices and topologies shown in FIGS. 1 and 2, and described above are only examples and the embodiments described herein may be implemented in networks comprising different network topologies or network devices, or using different protocols, without departing from the scope of the embodiments. For example, the network may include any number or type of network devices that facilitate passage of data over the network (e.g., routers, switches, gateways, controllers, appliances), network elements that operate as endpoints or hosts (e.g., servers, virtual machines, clients), and any number of network sites or domains in communication with any number of networks. Thus, network nodes may be used in any suitable network topology, which may include any number of servers, virtual machines, switches, routers, or other nodes interconnected to form a large and complex network, which may include cloud or fog computing. Nodes may be coupled to other nodes or networks through one or more interfaces employing any suitable wired or wireless connection, which provides a viable pathway for electronic communications.

Figure 3:
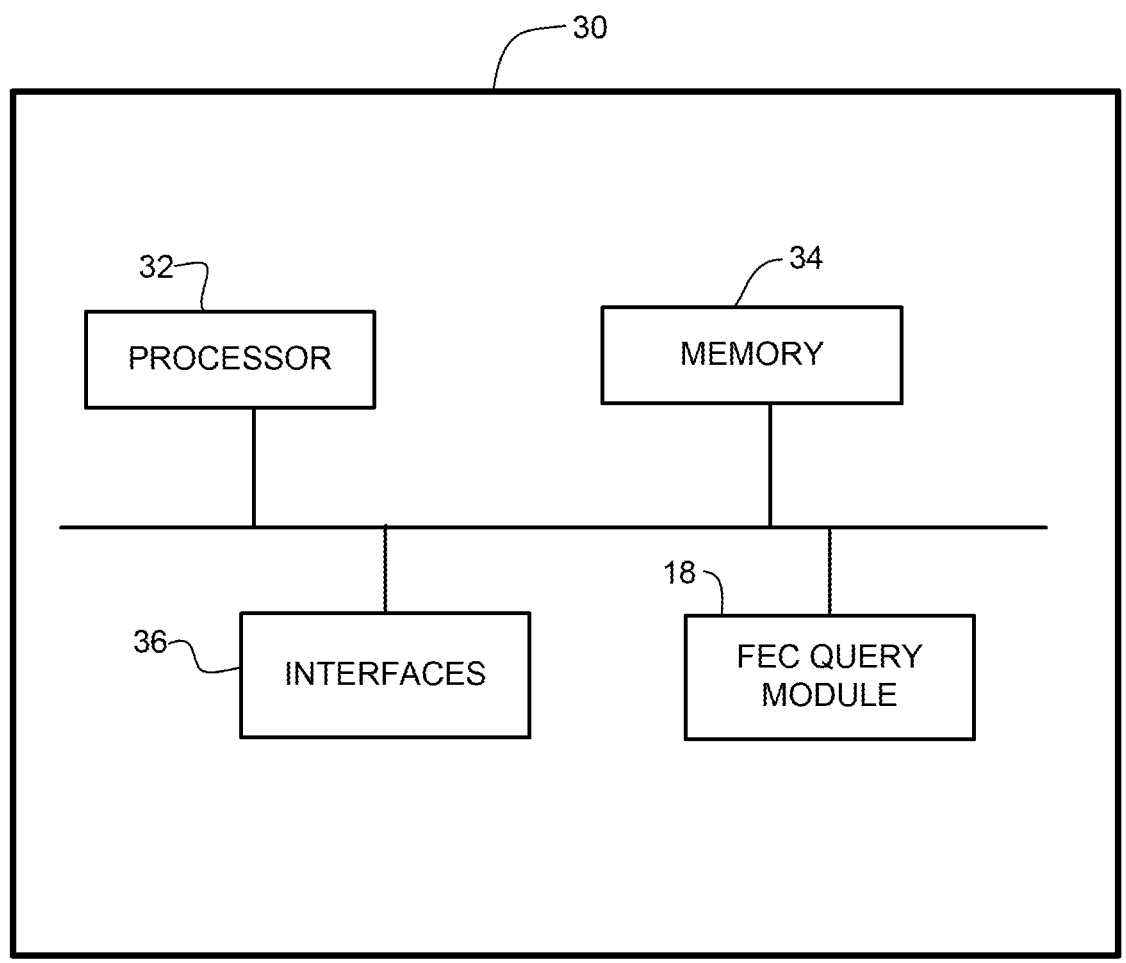
FIG. 3 depicts an example of a network device useful in implementing embodiments described herein.

FIG. 3 illustrates an example of a network device 30 that may be used to implement the embodiments described herein. In one embodiment, the network device 30 is a programmable machine that may be implemented in hardware, software, or any combination thereof. The network device 30 includes one or more processor 32, memory 34, network interfaces 36, and FEC query module 18.

Memory 34 may be a volatile memory or non-volatile storage, which stores various applications, operating systems, modules, and data for execution and use by the processor 32. For example, components of the FEC query module 18 (e.g., code, logic, database, etc.) may be stored in the memory 34. Memory 34 may also include an SR database, routing table (e.g., routing information base (RIB)), forwarding table (e.g., forwarding information base (FIB)), or any other data structure for use in routing or forwarding packets. The network device 30 may include any number of memory components.

Logic may be encoded in one or more tangible media for execution by the processor 32. For example, the processor 32 may execute codes stored in a computer-readable medium such as memory 34. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable medium. The network device 30 may include any number of processors 32.

The network interfaces 36 may comprise any number of interfaces (linecards, ports) for receiving data or transmitting data to other devices. The network interface 36 may include, for example, an Ethernet interface for connection to a computer or network.

It is to be understood that the network device 30 shown in FIG. 3 and described above is only an example and that different configurations of network devices may be used. For example, the network device 30 may further include any suitable combination of hardware, software, algorithms, processors, devices, components, or elements operable to facilitate the capabilities described herein.

Figure 4:
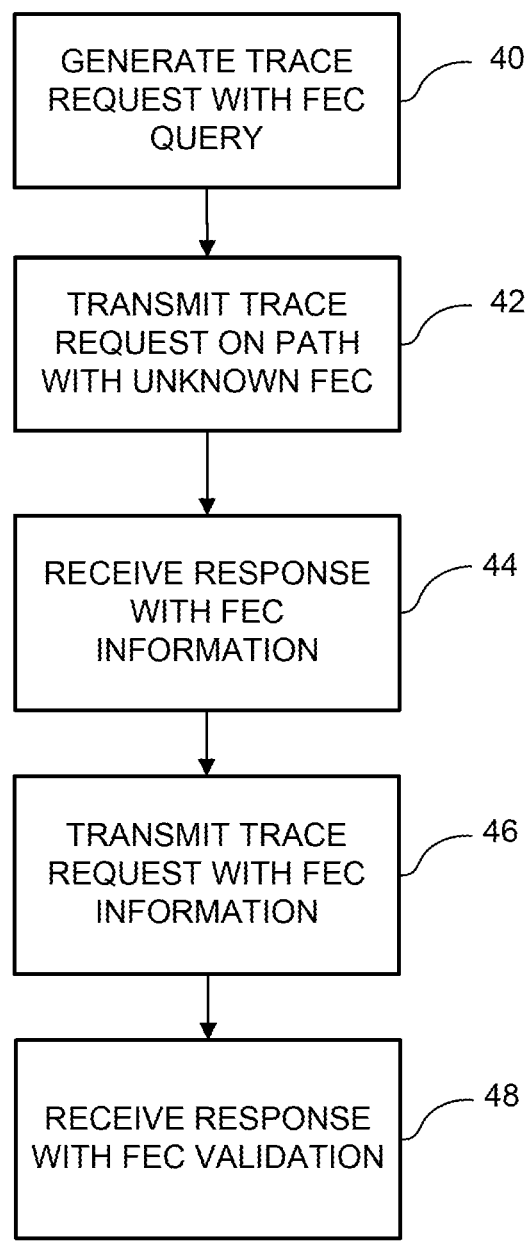
FIG. 4 is a flowchart illustrating a process for FEC stack based query, in accordance with one embodiment.

FIG. 4 is a flowchart illustrating an overview of a process for FEC query in Segment Routing networks, in accordance with one embodiment. As described above, the FEC query may be used in an LSP Ping or other traceroute, connectivity verification, or fault detection process. At step 40, an initiator node (e.g., node 10*a* in FIG. 1) generates a trace request (e.g., echo request) with at least one FEC query corresponding to a label in an FEC stack with an unknown FEC (e.g., node/label for which FEC details and control plane information are unknown). As described below, the trace request may be configured for operation in trace mode in which the trace request has an incrementing TTL, or ping mode in which the trace request has a TTL in the bottom label set to 1. The initiator transmits the trace request on a path with the unknown FEC (step 42). The initiator node 10*a* receives a first response providing FEC information for the node with the unknown FEC (step 44). The FEC information (details) may comprise, for example, a destination IP subnet, traffic class, or other identifier associated with a label and a forwarding path and representing a class or category of packets.

The initiator node 10*a* may then send another trace request with the FEC information inserted into the request (step 46). The initiator node 10*a* then receives a second response validating the FEC (step 48). The response may provide connectivity verification for a portion (or segment) of the path or the complete LSP. This process may be repeated any number of times to obtain FEC details and control plane information anywhere along the path so that end-to-end connectivity may be verified.

It is to be understood that the flowchart shown in FIG. 4 and described above is only an example and that steps may be added, combined, removed, or modified, without departing from the scope of the embodiments. For example, rather than using the FEC information for FEC validation, as described above for steps 46 and 48, the FEC information may be used for other means, such as remote learning for controller validation, or any other function. In one example, steps 46 and 48 may be replaced with a step for transmitting the FEC information to a controller, for use by the controller.

A detailed example of a process in accordance with one embodiment, for target FEC stack based FEC query in the network of FIG. 1 is provided in FIGS. 5-15. This example utilizes a trace mode in which the initiator includes an FEC-Query Sub-TLV 56 in the target FEC stack for each label in the stack with unknown FEC and the responder includes the FEC details associated with the top label in the label stack.

Figure 5:
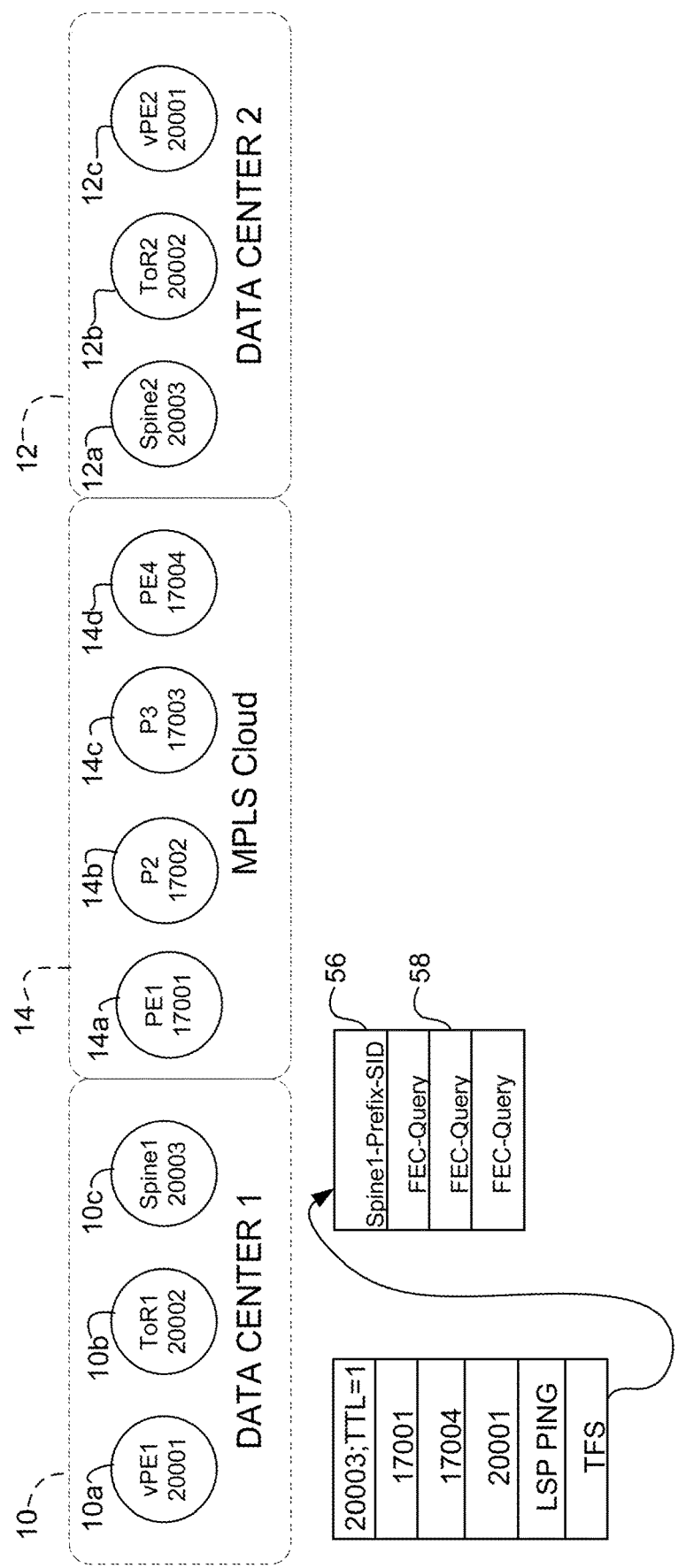
FIG. 5 illustrates a trace request generated at an initiator node in trace mode, in accordance with one embodiment.

Referring now to the example shown in FIG. 5, vPE1 (initiator node) is statically configured with a tunnel for vPE2 and is instructed to push {20003; 17001; 17004; 20001} as a label stack. Node vPE1 may not be aware of the FEC details for each label. Therefore, if conventional LSP ping is triggered from vPE1, it would not have sufficient details to use in the Target FEC stack. As previously noted, this raises challenges in validating the LSP Path. As described below, the TFS sub-TLV FEC query is used to query an upstream node for control plane details on the FEC.

In the topology shown in FIG. 5, vPE1 and Spine1 are in the same domain. When vPE1 triggers an LSP trace to vPE2, it includes the Target FEC Stack and populates the same with FEC-Query Sub-TLV 58 for each label in the label stack with unknown FEC. The initiator (vPE1) includes an FEC query 58 to FECs corresponding to all segments imposed in the label stack for which FEC details and control plane information are unknown. In this example, the stack includes three FEC-Query entries corresponding to labels 17001, 17004, and 20001. In many cases, the top label in the TFS Sub-TLV will be available in the IGP control plane of the initiator (e.g., if they belong to same domain). As an optimization, the initiator may use reverse label lookup (by using the top label and search for the FEC details in IGP database) and populate the top Sub-TLV 56 in the TFS.

In this example, vPE1 includes the FEC details of Spine1 as top FEC 56 (Spine1-Prefix-SID). All remaining FECs in the target FEC stack are populated as FEC-Query 58. The TTL (time-to-live) of the label stack is set to sequentially increment from 1. As shown in FIG. 5, top label 20003 includes a TTL=1. Each subsequent trace request originated by the initiator includes a TTL that is set successively to 1, 2, and so on.

Figure 6:
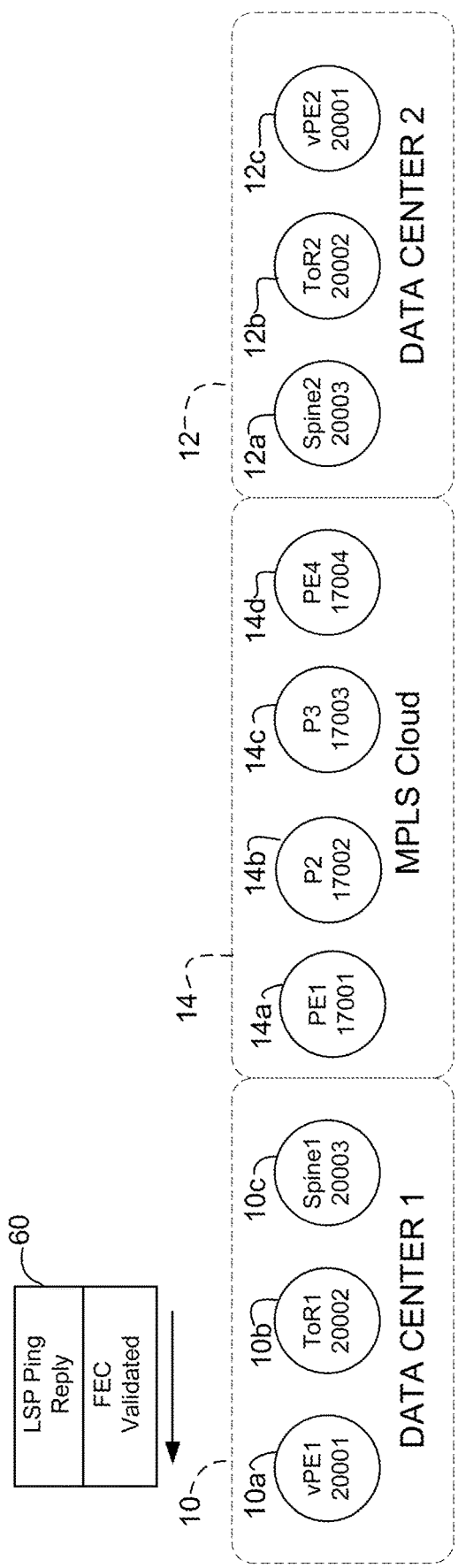
FIG. 6 illustrates a response validating an FEC in the first data center.

FIG. 6 illustrates a trace response 60 in which ToR1 validates the top FEC (Spine1-Prefix-SID) and replies to the trace request shown in FIG. 5. In one example, the reply may be generated and transmitted in accordance with RFC 4379 (referenced above).

Figure 7:
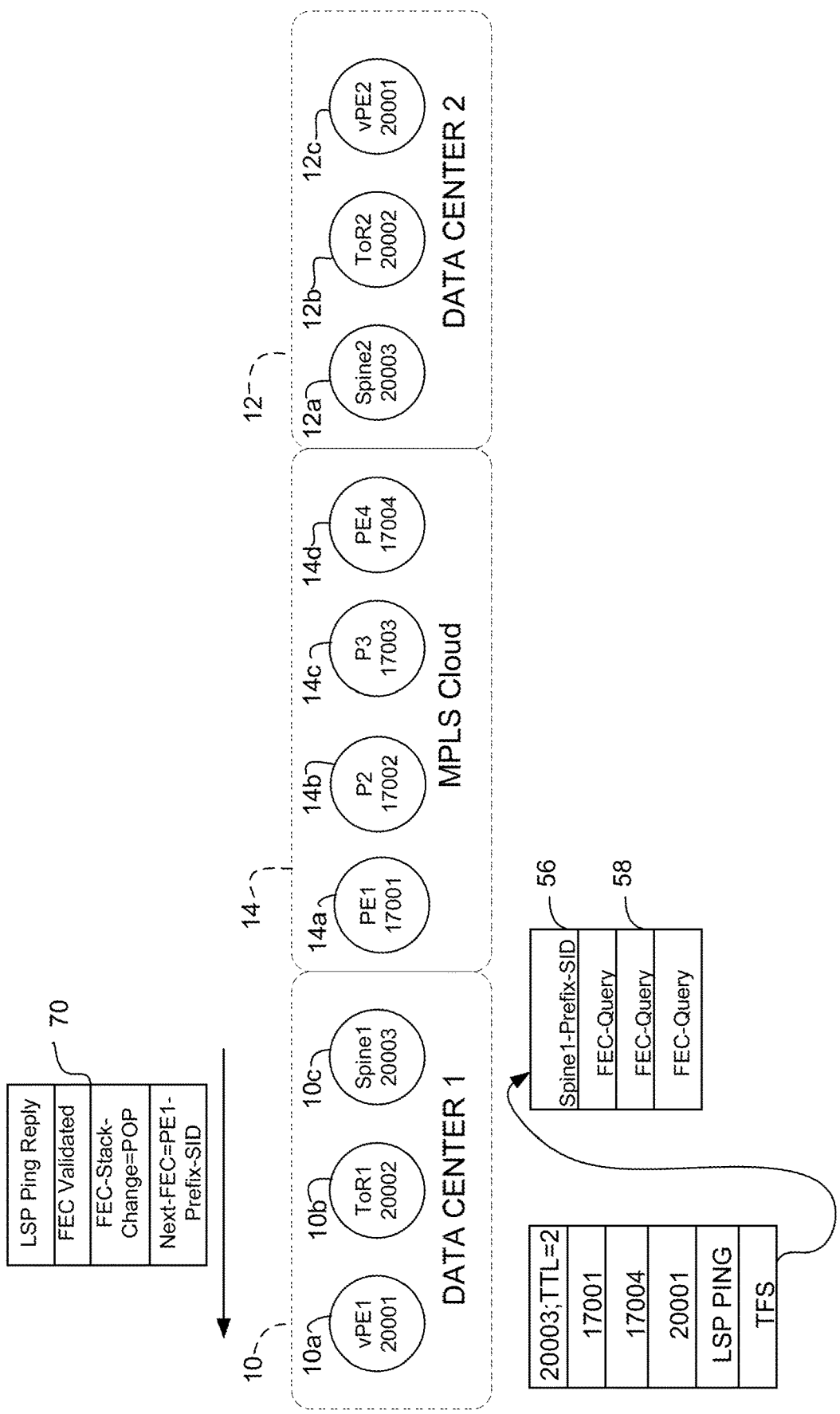
FIG. 7 illustrates a trace request with an FEC query and a trace response including FEC details for a node in an MPLS cloud.

FIG. 7 illustrates contents of a second trace packet transmitted from initiator node vPE1. The trace request shown in FIG. 7 is similar to the first trace request shown in FIG. 5, except the TTL is now set equal to 2. The TFS Sub-TLV includes the FEC 56 for Spine1 and the three FEC-Query entries 58 (as described above with respect to FIG. 5). As shown in FIG. 7, when the transit node (Spine1) replies with POP, the responder will include the FEC details of the associated label in the label stack since the underlying FEC in TFS is "FEC-Query". In response to the trace packet, Spine1 replies and includes the FEC details of the next label (Label=17001) in the response 70 (Next-FEC=PE1-Prefix-SID). Spine1 may reply with FEC Stack Change (e.g., as per RFC 6424 or other suitable method). As may be noted, the replying node (Spine1) and the node that actually validates the FEC (PE1) are different, therefore any discrepancy should be detected.

Figure 8:
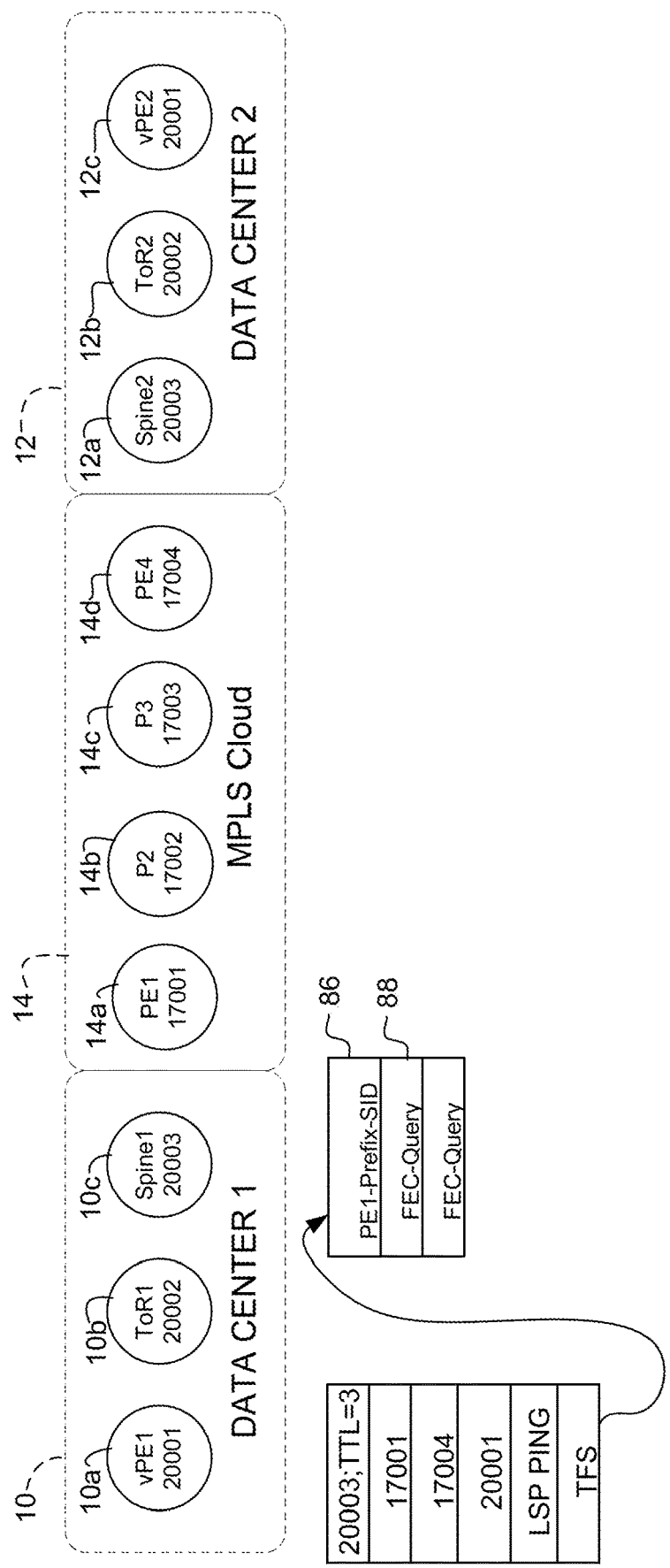
FIG. 8 illustrates a trace request with the FEC query replaced with the FEC received in the response of FIG. 7.

As shown in FIG. 8, the initiator (vPE1) next generates a trace packet with an FEC stack including the FEC details 86 received from the responder (Spine1) and two FEC-Query entries 88. The TTL is set equal to 3 and the trace packet is processed at PE1 in the MPLS cloud 14 as shown in FIG. 9.

Figure 9:
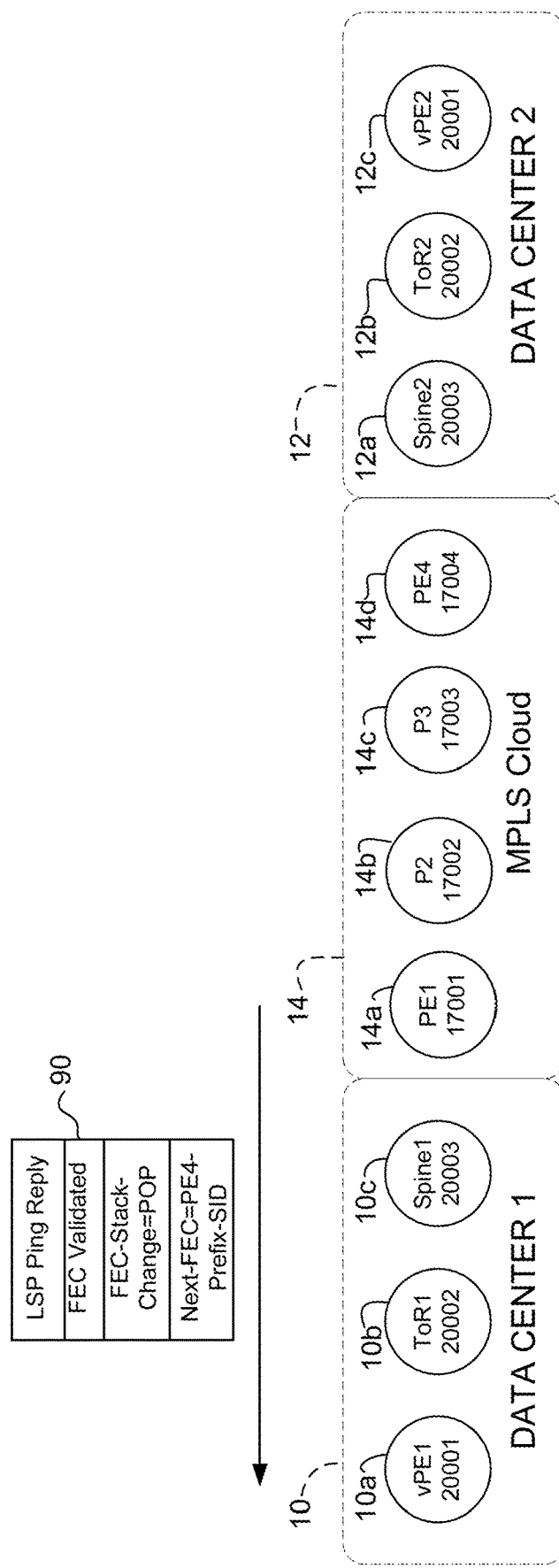
FIG. 9 illustrates another response providing FEC details of a next label in the MPLS cloud.

Referring now to FIG. 9, PE1 replies with FEC-Stack-Change (POP) in trace response 90. While replying, PE1 includes FEC details of the next label (17004 corresponding to PE4) due to the FEC-Query. The FEC details for PE4 are shown in the response as Next-FEC=PE4-Prefix-SID.

Figure 10:
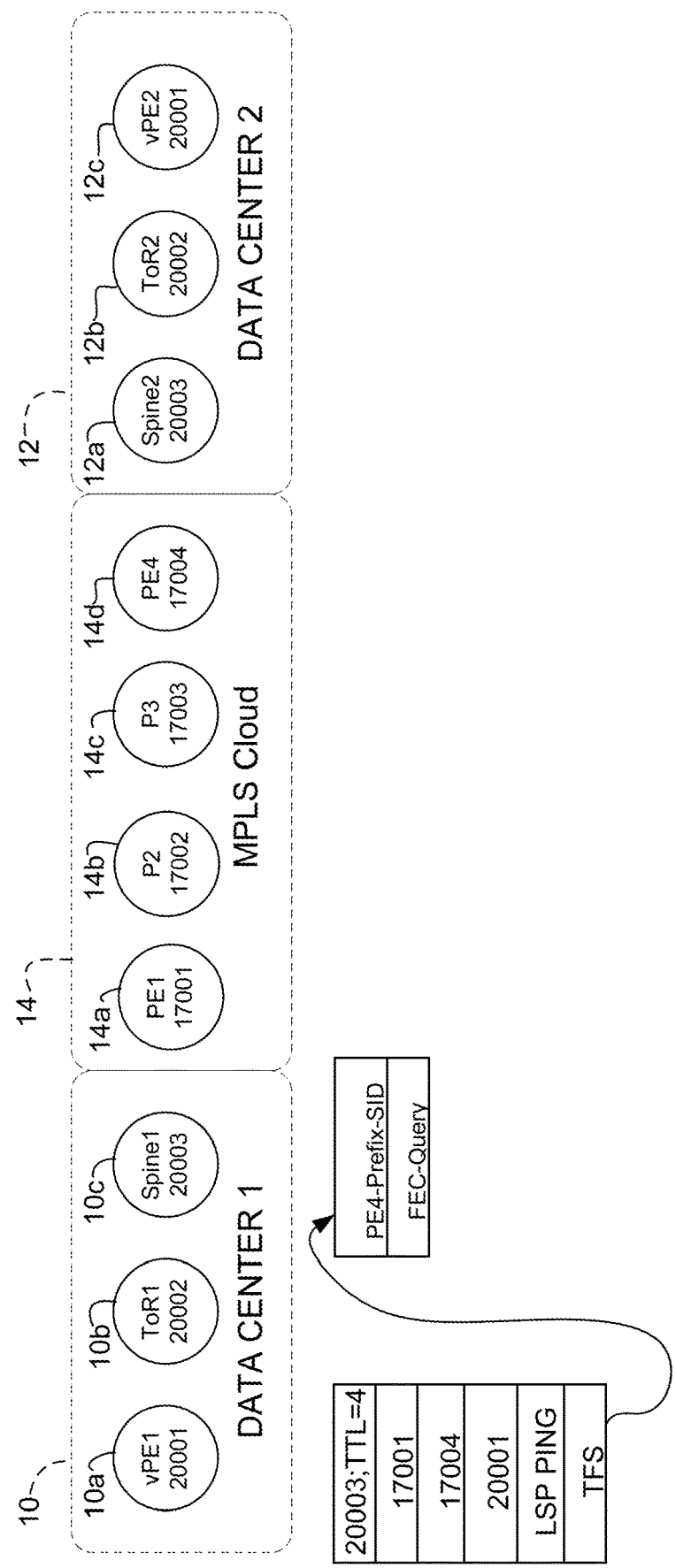
FIG. 10 illustrates a trace request with the FEC query replaced with the FEC received in the response of FIG. 9.

The initiator (vPE1) then POPs the top FEC-TLV from the Target FEC stack and replaces the FEC-Query with the FEC information received in the response (PE4-Prefix-SID), as shown in FEC stack of FIG. 10. The initiator also increments the TTL by one so that it is now equal to 4.

Figure 11:
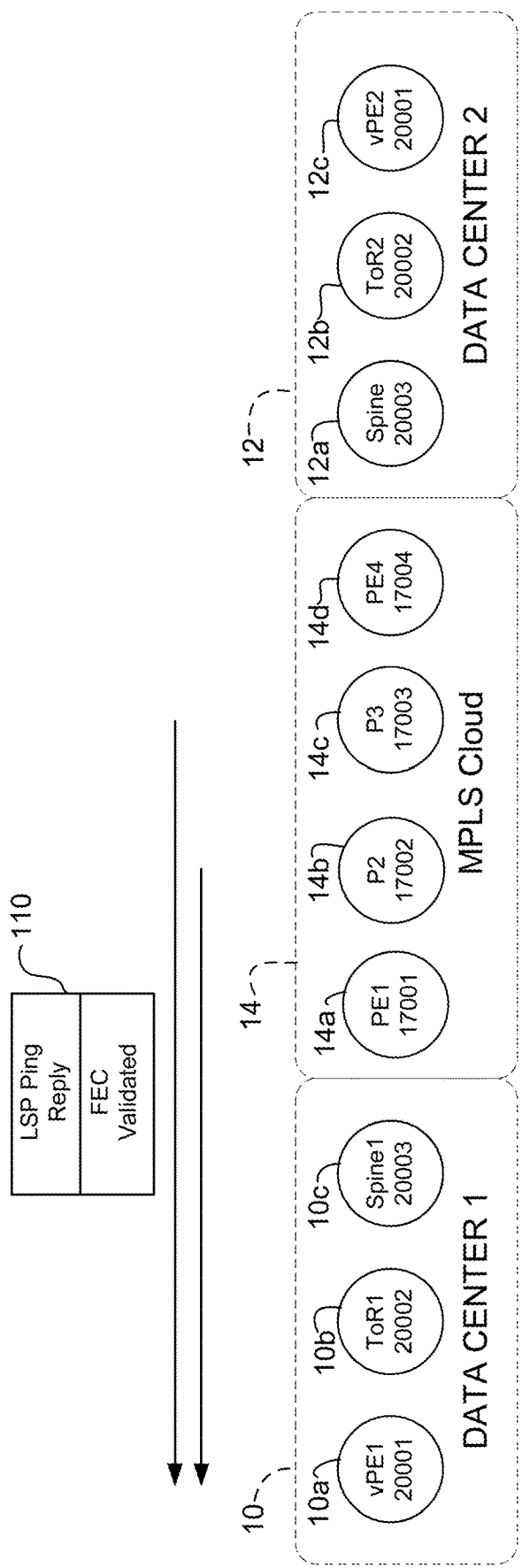
FIG. 11 illustrates FEC validation in the MPLS cloud in response to the trace request in FIG. 10.

Referring now to FIG. 11, P2 (for TTL=4) and P3 (for TTL=5) validate the top FEC and reply back with a trace response 110 (e.g., in accordance with RFC 4379, referenced above).

Figure 12:
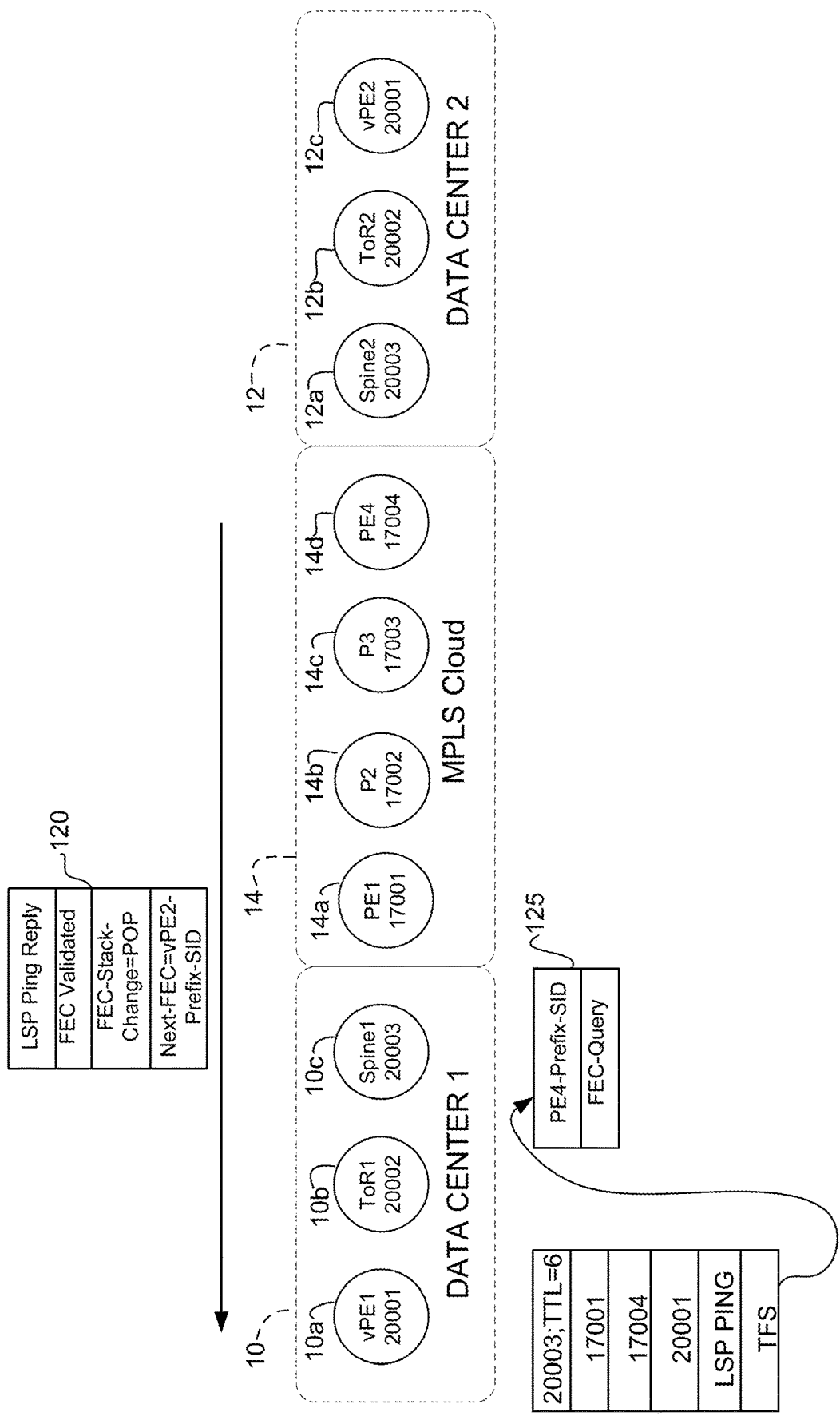
FIG. 12 illustrates a trace request and a response providing FEC details for a node in a second data center.

As shown in FIG. 12, the next trace request generated by the initiator node vPE1 comprises TFS Sub-TLV 125, which includes the previously received FEC details for PE4 (PE4-Prefix-SID) and one FEC-Query for remaining label 20001 (corresponding to vPE2). The TTL is now set to 6 by the initiator. PE4 replies with trace response 120 with FEC-Stack-Change (POP) and includes FEC details of the next label (Next-FEC=vPE2-Prefix-SID) due to the remaining FEC-Query in the FEC stack transmitted in the trace request.

Figure 13:
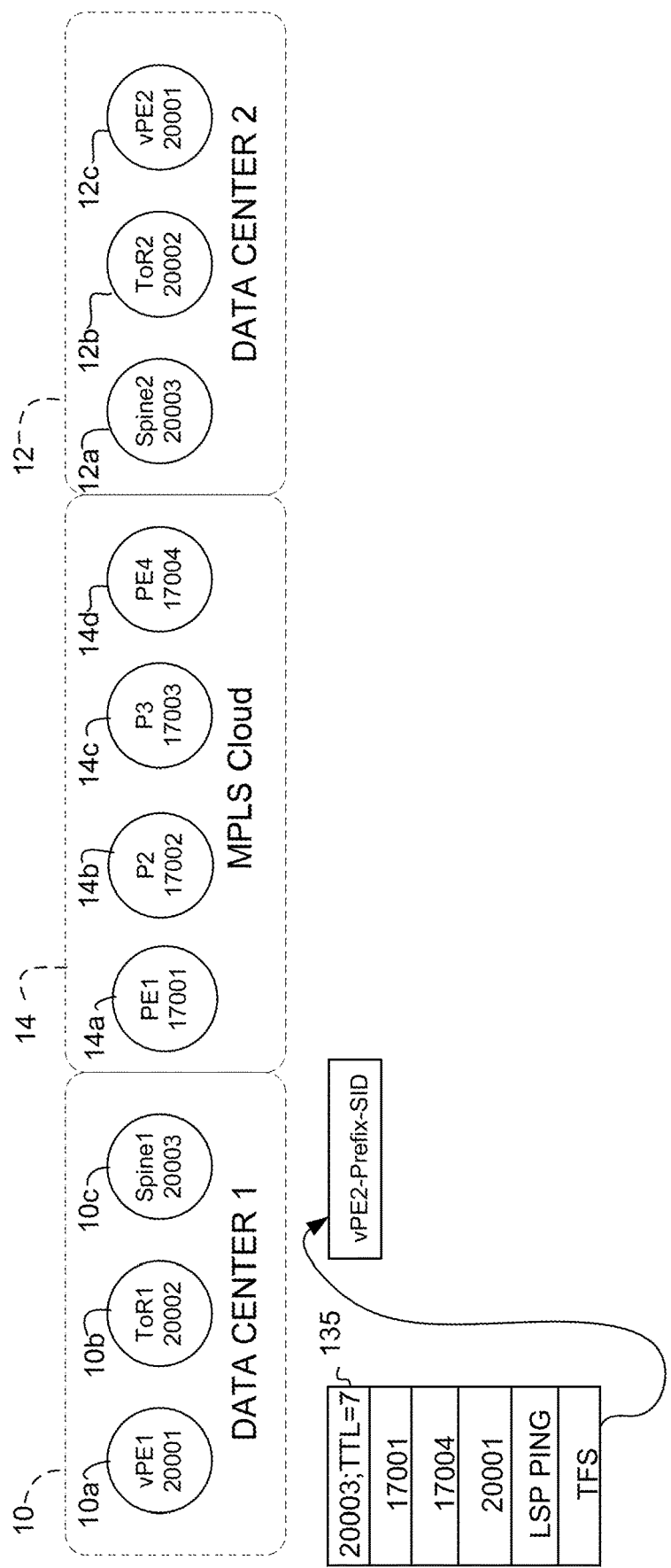
FIG. 13 illustrates another trace request in which the FEC query was replaced with the FEC received in the response of FIG. 12.

The initiator then POPs the top FEC TLV from the Target FEC Stack and replaces the first FEC-Query with the FEC received in the trace response in FIG. 12 (vPE2-Prefix-SID) to generate the next trace request 135 (FIG. 13). The TTL is incremented to 7.

Figure 14:
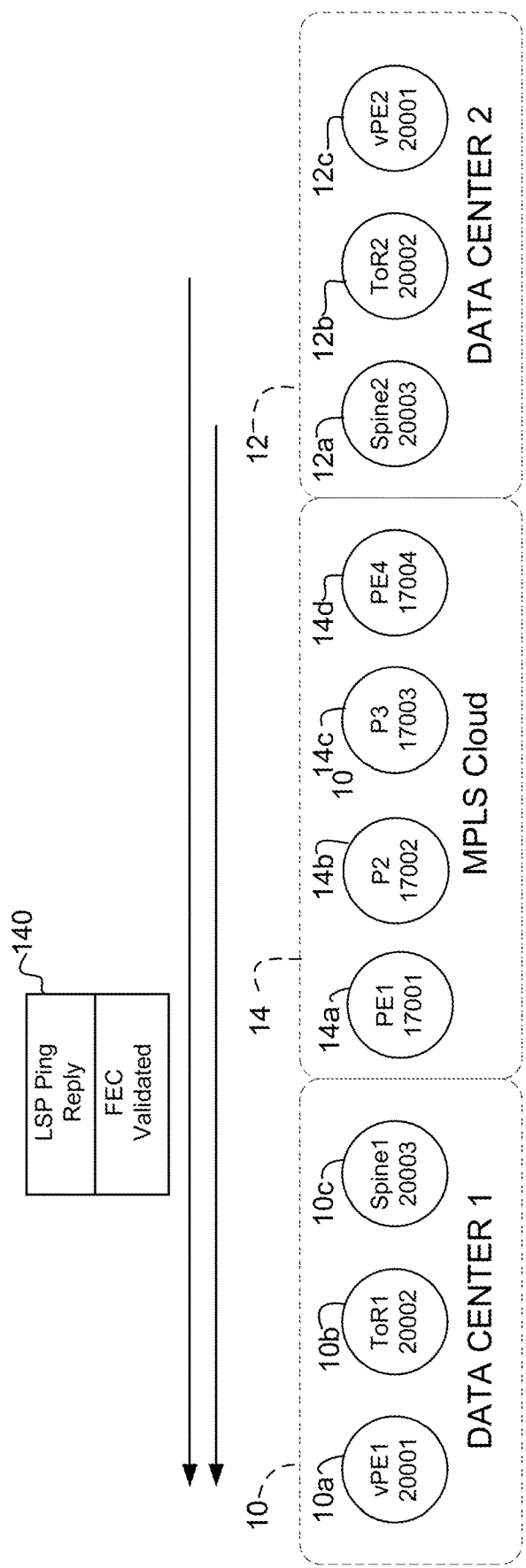
FIG. 14 illustrates FEC validation in the second data center in response to the trace request shown in FIG. 13.

As shown in FIG. 14, Spine2 (for TTL=7) and ToR2 (for TTL=8) validate the top FEC in the trace request of FIG. 13 and reply back with LSP Ping Reply and FEC Validated (e.g., per RFC 4379) in response 140.

Figure 15:
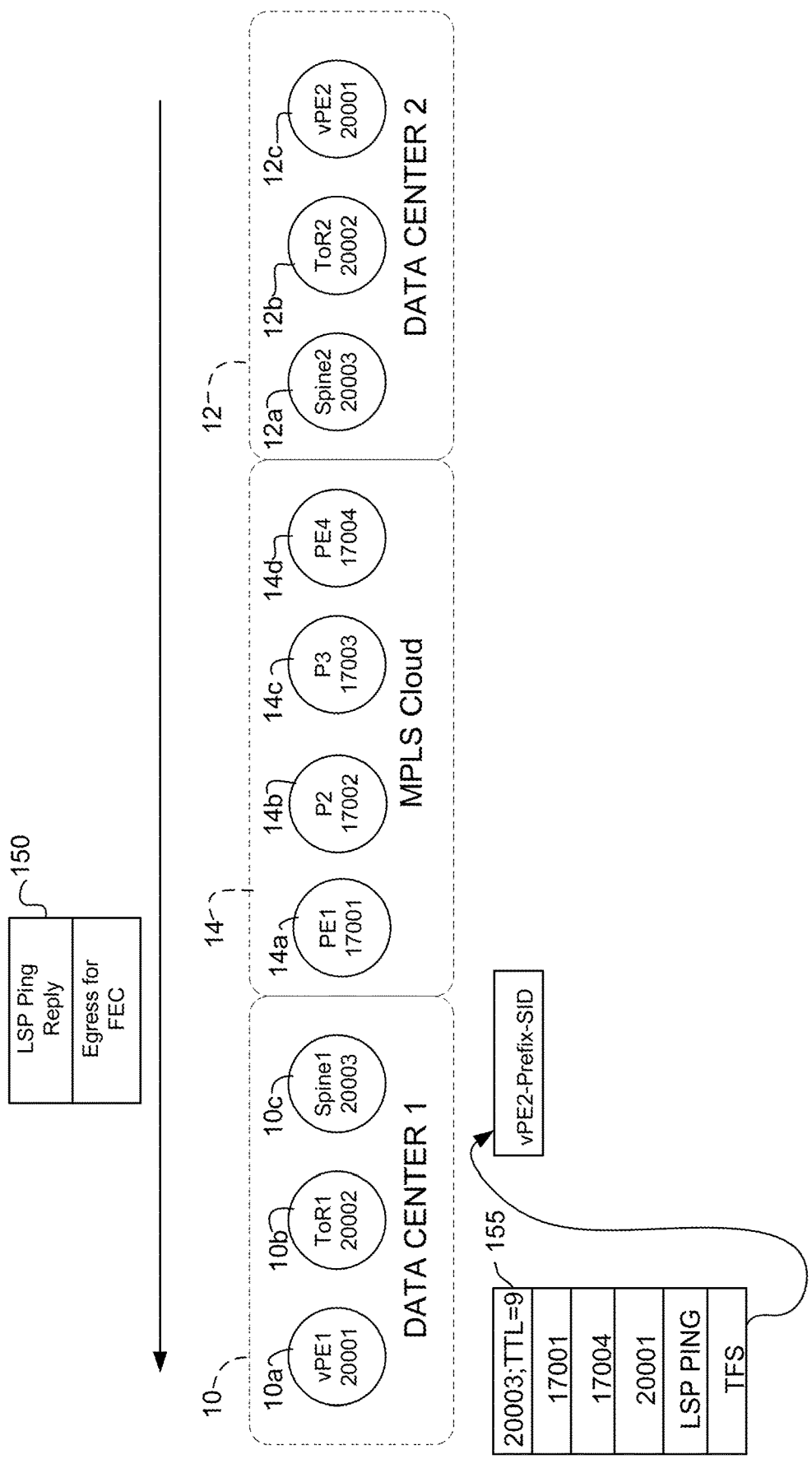
FIG. 15 illustrates a trace request and a response from an egress node validating the top FEC in an LSP.

Node vPE2 (for TTL=9) can now validate the top FEC in response to trace request 155 and reply back with Egress for FEC in trace response 150, as shown in FIG. 15. As previously noted, vPE2 may generate a trace response (echo reply) in accordance with RFC 4379.

FIGS. 16-19 illustrate a process for Target FEC Stack based FEC query utilizing Ping mode, in accordance with one embodiment. In Ping mode, the initiator sets the TTL (time-to-live) of bottom label as 1 and sets the Target FEC Stack Sub-TLV with FEC-Query. The responder replies back with the FEC of the last label and the initiator uses the same for LSP Ping.

Figure 16:
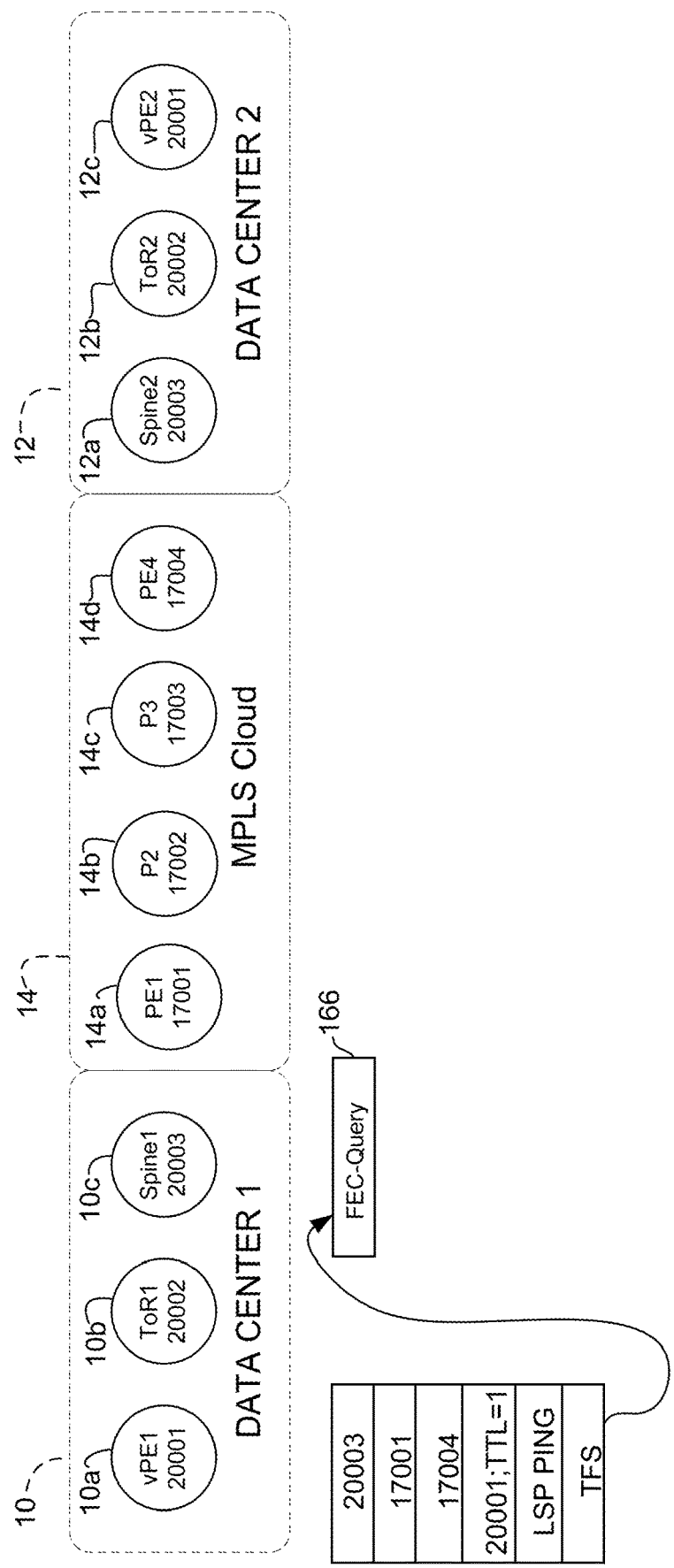
FIG. 16 illustrates a trace packet generated at an initiator node in ping mode, in accordance with one embodiment.

FIG. 16 illustrates initiator behavior for ping mode. Node vPE1 sets FEC in Target FEC Stack 166 as FEC-Query and sets the TTL of bottom label to 1. The initiator (vPE1) includes an FEC-Query for the FEC corresponding to the destination of the segment.

Figure 17:
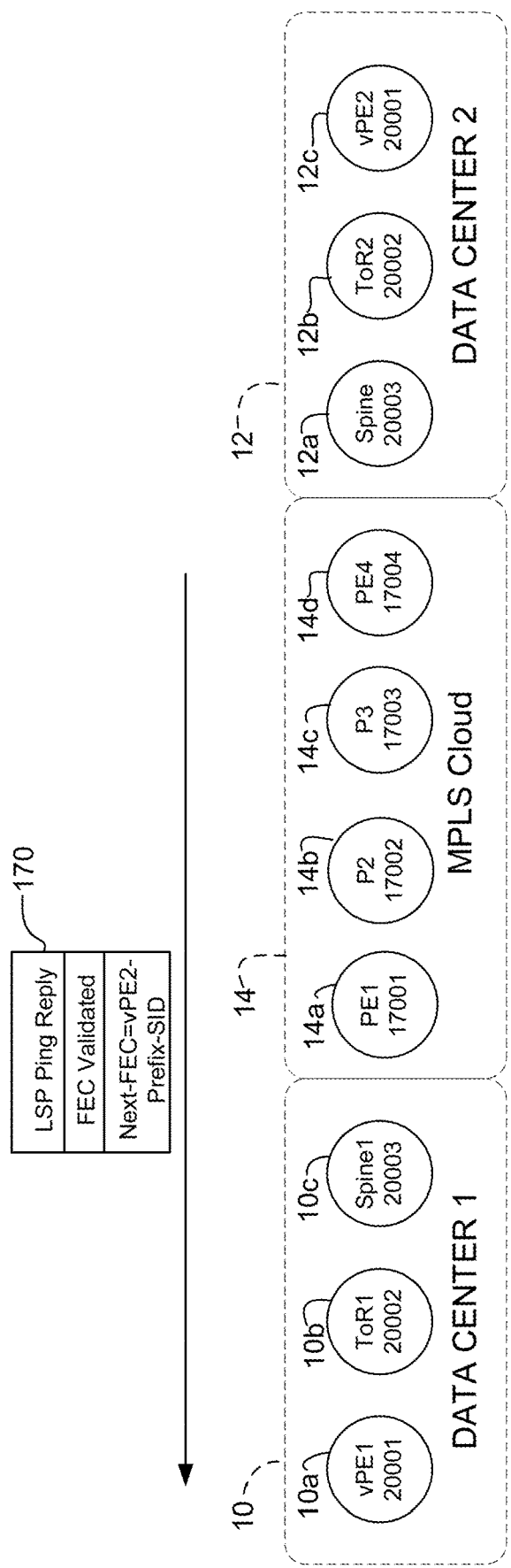
FIG. 17 illustrates a trace response providing FEC details for an egress node.
Figure 18:
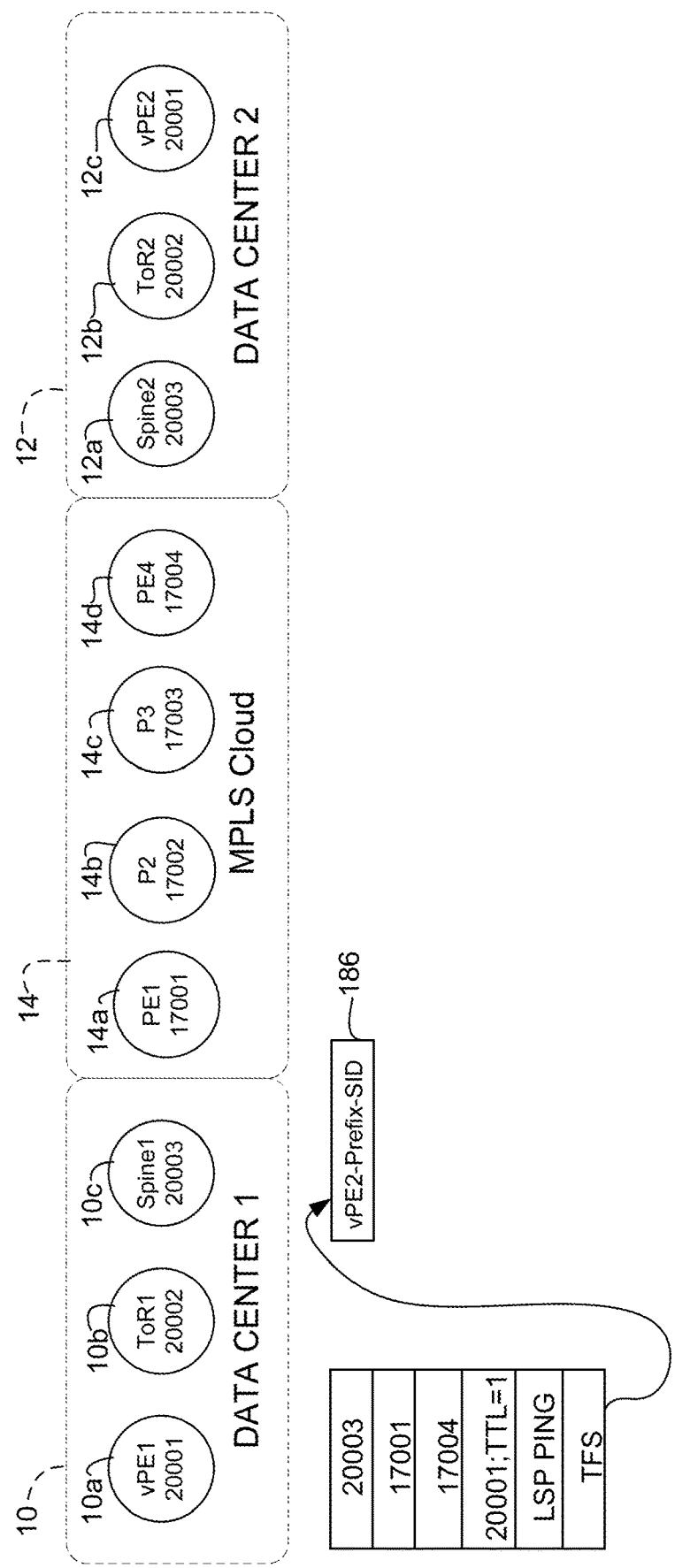
FIG. 18 illustrates a trace request containing the FEC details from the response in FIG. 17.

As shown in FIG. 17, PE4 replies with trace response 170 including FEC details of next label (Next-FEC=vPE2-Prefix-SID) due to FEC-Query in the trace request of FIG. 16.

Initiator node vPE1 can now set FEC in Target FEC Stack 186 to vPE2-SID (FIG. 18) based on the FEC details received in trace response 170 (FIG. 17) and transmit the trace request to vPE2.

Figure 19:
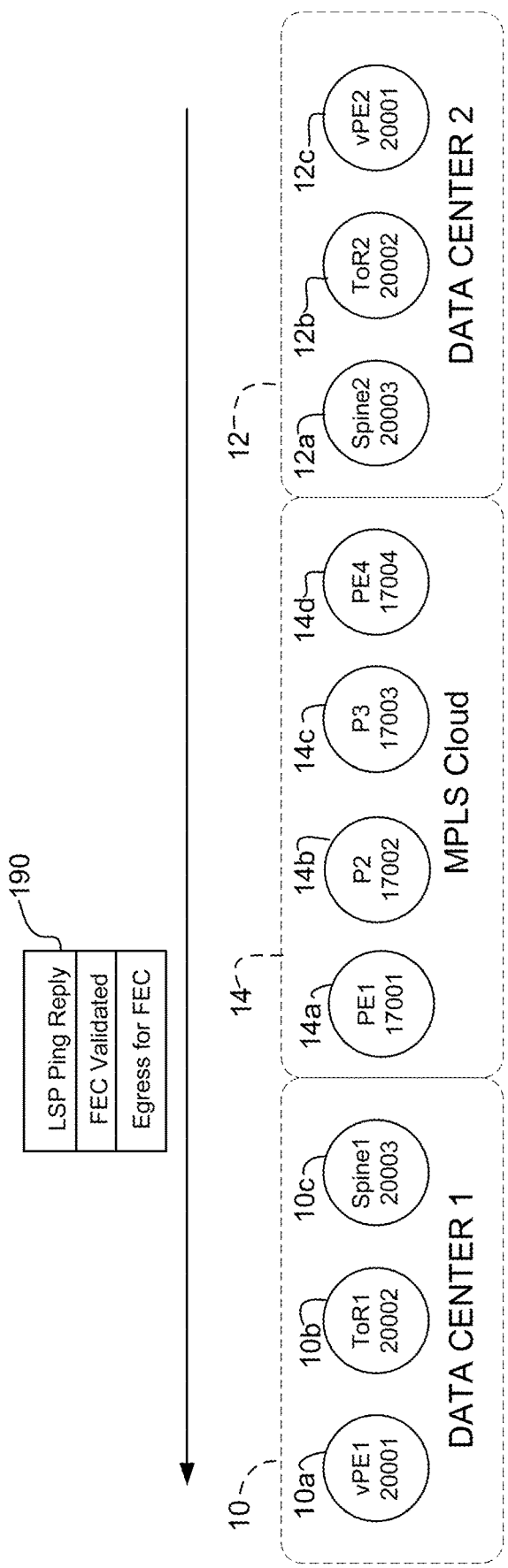
FIG. 19 illustrates a trace response from an egress node validating the FEC.

As shown in FIG. 19, egress node vPE2 replies with a trace response 190 providing FEC validation for the LSP.

It is to be understood that the topology and processes described above and shown in FIGS. 5-19 are only examples and that the embodiments described herein may be implemented in other topologies and use other processes, protocols, or packet formats without departing from the scope of the embodiments.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
   generating a trace request at an initiator node configured for segment routing, said trace request comprising an FEC (Forwarding Equivalence Class) query corresponding to a label in an FEC stack with an unknown FEC;
   transmitting said trace request on a path with said unknown FEC; and
   receiving a response to said trace request, the response comprising FEC information including an identifier associated with a label and a forwarding path and representing a class or category of packets.

2. The method of claim 1 wherein the FEC information provides end-to-end validation of an LSP (Label Switched Path).

3. The method of claim 1 wherein the FEC information is used to detect data plane failures.

4. The method of claim 1 wherein the FEC information is used for controller validation.

5. The method of claim 1 wherein the FEC information is used for FEC validation.

6. The method of claim 1 wherein the FEC information comprises control plane details used to fill in a target FEC stack.

7. The method of claim 1 wherein the initiator node comprises a segment routing head end node and control plane information of a segment routing stack are unknown by the segment routing head end node, wherein the control plane information is included in the response.

8. The method of claim 1 further comprising transmitting a second trace request comprising the FEC information, wherein said second trace request is transmitted on an LSP (Label Switched Path) over at least one MPLS (Multiprotocol Label Switching) tunnel.

9. The method of claim 8 further comprising receiving a response to said second trace request, wherein said response provides FEC validation.

10. The method of claim 1 wherein said trace request comprises a Target FEC Stack Sub-TLV containing said FEC query and wherein the Target FEC Stack Sub-TLV comprises said FEC query for each label in a label stack with unknown FEC details.

11. The method of claim 10 further comprising transmitting a second trace request replacing said FEC query in the Target FEC Stack Sub-TLV with the received FEC information.

12. The method of claim 1 wherein the path comprises at least two stitched LSPs (Label Switched Paths).

13. An apparatus comprising:
   an interface for transmitting packets on an LSP (Label Switched Path);
   a processor for generating a trace request at an initiator node configured for segment routing, said trace request comprising an FEC (Forwarding Equivalence Class) query, transmitting said trace request, and processing a response to said trace request, the response comprising FEC information including an identifier associated with a label and a forwarding path and representing a class or category of packets; and memory for storing the FEC information.

14. The apparatus of claim 13 wherein the processor is further configured to transmit the FEC information to a controller for use by the controller.

15. The apparatus of claim 13 wherein said trace request comprises a Target FEC Stack Sub-TLV containing said FEC query.

16. The apparatus of claim 13 wherein transmitting said trace request comprises setting a Time-to-Live (TTL) of a bottom label to one and inserting said FEC query into said trace request for an egress node of the LSP.

17. Logic encoded on one or more non-transitory computer readable media for execution and when executed operable to:

generate a trace request at an initiator node configured for segment routing, said trace request comprising an FEC (Forwarding Equivalence Class) query corresponding to a label in an FEC stack with an unknown FEC;

transmit said trace request on a path with said unknown FEC; and process a response to said request, the response comprising FEC information including an identifier associated with a label and a forwarding path and representing a class or category of packets.

18. The logic of claim 17 wherein the FEC information provides end-to-end validation of an LSP (Label Switched Path).

19. The logic of claim 18 wherein said validation provides end-to-end validation of stitched LSPs.

20. The logic of claim 17 wherein said trace request comprises a Target FEC Stack Sub-TLV containing said FEC query.

* * * * *